United States Patent [19]

Fukao

[11] 3,900,712

[45] Aug. 19, 1975

[54] KEYBOARD SWITCH ARRANGEMENT

[75] Inventor: Satoshi Fukao, Kasugai, Japan

[73] Assignee: Brother Kogyo Kabushiki Kaisha, Japan

[22] Filed: Jan. 18, 1974

[21] Appl. No.: 434,591

[30] Foreign Application Priority Data

Feb. 23, 1973 Japan .............................. 48-22564

[52] U.S. Cl. .................. 200/307; 197/98; 200/5 A; 200/295; 235/145 R; 317/249 R; 340/365 C

[51] Int. Cl. ......................... H01h 13/04; B41j 5/08

[58] Field of Search..... 200/5 R, 5 A, 52 R, DIG. 1, 200/159 R, 307, 294, 295, 296; 317/249 R, 249 D; 340/365 R, 365 C; 235/145 R; 46/24, 25; 197/98

[56] References Cited

UNITED STATES PATENTS

| | | | |
|---|---|---|---|
| 2,472,363 | 6/1949 | Blackinton | 46/25 |
| 3,545,122 | 12/1970 | Onanian | 46/25 |
| 3,586,806 | 6/1971 | Swisher | 200/294 X |
| 3,696,908 | 10/1972 | Gluck et al. | 200/DIG. 1 UX |
| 3,710,209 | 1/1973 | Webb et al. | 200/DIG. 1 X |
| 3,751,612 | 8/1973 | Hansen | 200/DIG. 1 X |
| 3,760,243 | 9/1973 | Peroutky | 200/DIG. 1 X |
| 3,797,630 | 3/1974 | Zilkha | 197/98 |

FOREIGN PATENTS OR APPLICATIONS

| | | | |
|---|---|---|---|
| 2,000,946 | 9/1969 | France | 200/307 |

*Primary Examiner*—James R. Scott
*Attorney, Agent, or Firm*—George B. Oujevolk

[57] ABSTRACT

A keyboard switch arrangement mounted on a base plate and having a plurality of key stem holder blocks, each of which protects a key stem from slipping out and has coupling portions of ridges and grooves on the outer side walls coupled in contiguous relation to one another in a manner that one ridge in one block is fitted in one groove of the adjacent block.

8 Claims, 21 Drawing Figures

FIG.13
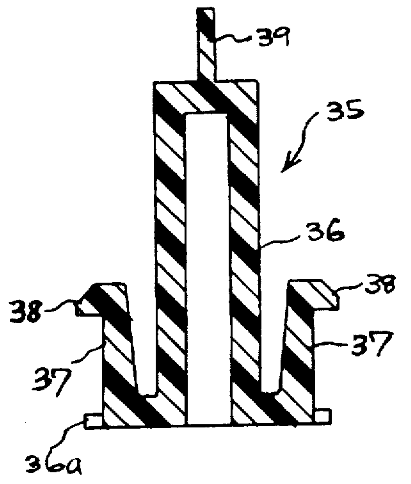
FIG.14
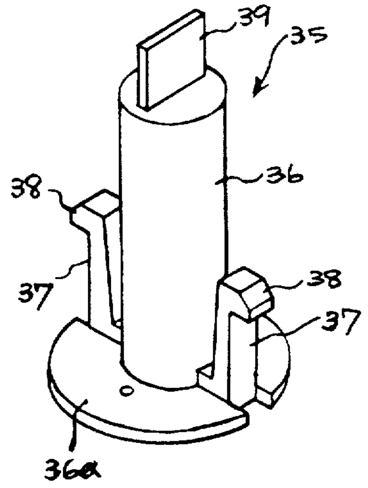
FIG.17
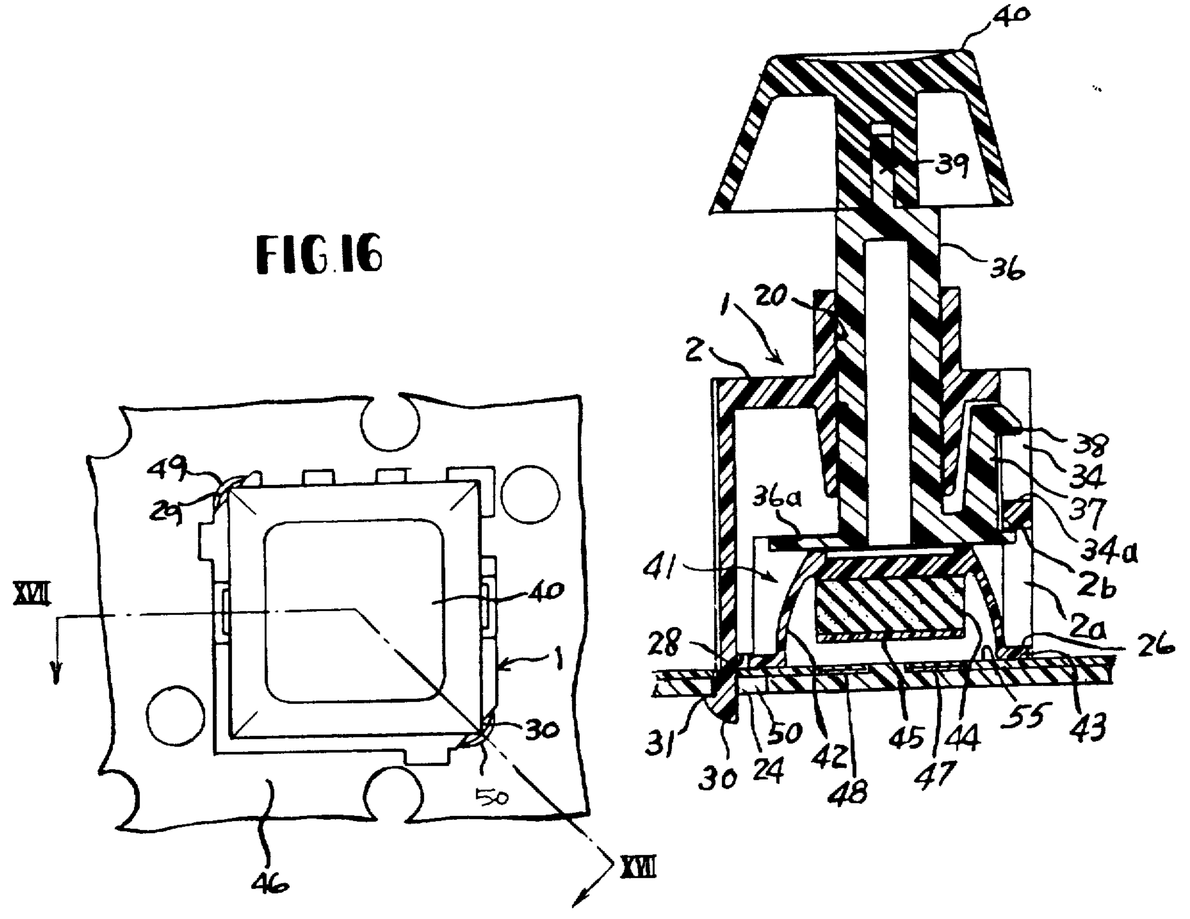
FIG.16 FIG.17

KEYBOARD SWITCH ARRANGEMENT

BACKGROUND OF THE INVENTION

This invention relates to a keyboard switch arrangement having a plurality of keys on a base plate and more particularly to an electronic input information machine using input keys.

BRIEF DESCRIPTION OF THE PRIOR ART

In the prior art keyboard encorder, the keyboard switch arrangement has a plurality of keys, each of which has a key stem, with a stem holder block. For mounting the holder block on a base plate, for example a printed circuit board, several engaging projections are formed at the lower end and are engaged by means of insertion in holes of the base plate. Therefore, during check and maintenance the holder block is free to be dismounted from the base plate.

However, in such an arrangement, the projections of the holder block are easily deformed resiliently and are also easy to be moved by an external force in a direction parallel to the plane of the base plate. Therefore it is difficult to mount the holder block on the base plate in a stable manner.

Furthermore, there has been proposed a construction wherein the ends of the projections are rivetted to the base plate by crushing after the projections are inserted. With this type of arrangement, the holder block is firmly mounted on the base plate, but consequently it is extremely difficult to dismount the holder block from the base plate for check and maintenance.

OBJECTS OF THE INVENTION

It is accordingly an object of this invention to provide a compact, mechanically as well as electrically stable keyboard switch arrangement resistant to the external forces against the keys and the holder blocks wherein a unit is formed by causing the holder blocks to concurrently be coupled in contiguous relation to one another and mounted on the base plate.

Another object of the invention is to provide a keyboard switch arrangment wherein holder blocks can be mounted and dismounted easily for check and maintenance.

Still another object of the invention is to provide a keyboard switch arrangement which can be freely arranged in various modes by properly selecting the coupling portions of ridges and grooves formed on the outer side walls of respective holder blocks.

SUMMARY OF THE INVENTION

According to this invention, there is provided a keyboard switch arrangement consisting of a plurality of key switch units, each comprising a key stem holder block, for protecting a stem from slipping out, mounted on a base plate by the engaging projections inserted into holes formed at the base plate and having a groove on one outer side wall, a ridge on the opposite outer side wall for fitting into a groove of the similar adjacent holder block, a plurality of grooves on another outer side wall and a ridge on the remaining opposite outer side wall for selectively being fitted into the groove of a similar adjacent holder block; a pair of fixed electrodes provided on the base plate with an electrically insulating layer on the surface; a movable electrode mechanism including a resilient member made of an electrically insulating material, which has, at the lower end, an electrode layer constituting a capacitor switch with the aforesaid fixed electrodes and an inverted cup like, i.e., a truncated conical-shaped resilient cone stably held between the base plate and a disc-shaped portion of the key stem and has a restoring force against deformation be depressing downwardly.

BRIEF DESCRIPTION OF THE DRAWINGS

FIG. 13 is a vertical sectional view of the arrangement shown in FIG. 10;

FIG. 14 is a perspective view of the key stem shown in FIG. 10;

FIG. 16 is a plan view of the key switch unit after assembled;

FIG. 17 is a vertical sectional view along line XVII—XVII of FIG. 16;

DETAILED DESCRIPTION OF THE INVENTION

Figure 1:
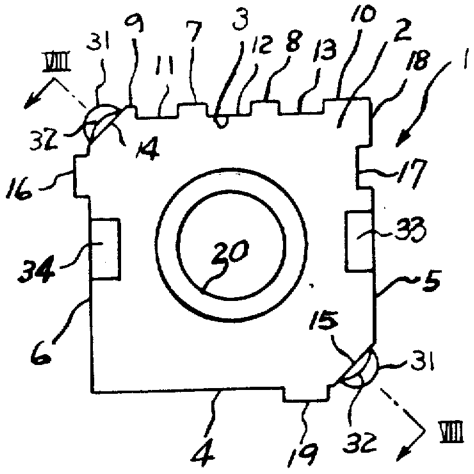
FIG. 1 shows a plan view of the key stem holder block of a keyboard switch arrangement according to an embodiment of this invention.
Figure 3:
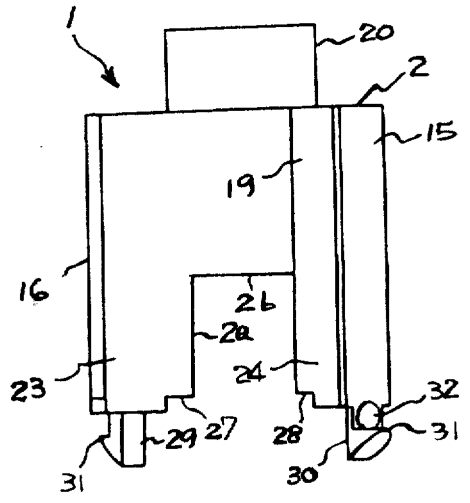
FIG. 3 is a front view of the arrangement shown in FIG. 1.
Figure 2:
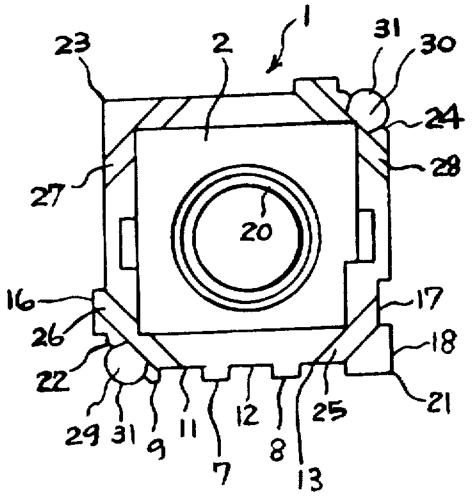
FIG. 2 is a bottom view of the arrangement shown in FIG. 1.
Figure 4:
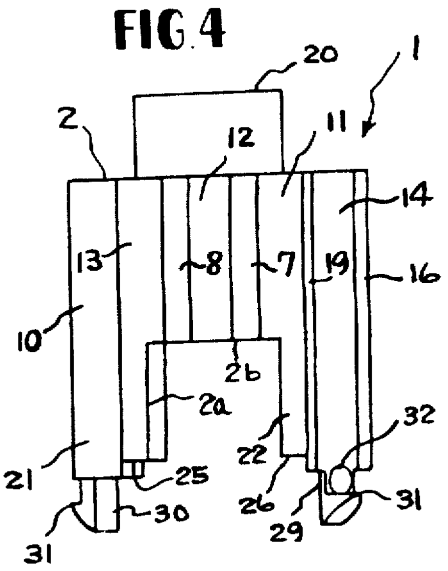
FIG. 4 is a back view of the arrangement shown in FIG. 1.
Figure 5:
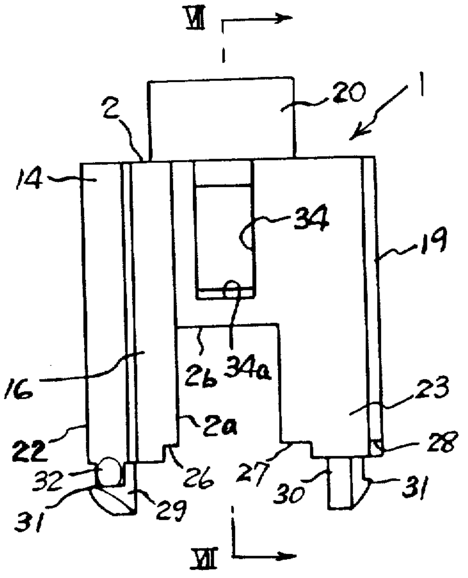
FIG. 5 is a left side view of the arrangement shown in FIG. 1.
Figure 6:
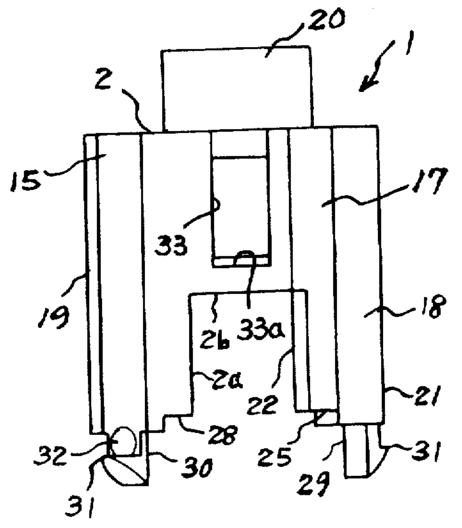
FIG. 6 is a right side view of the arrangement shown in FIG. 1.
Figure 7:
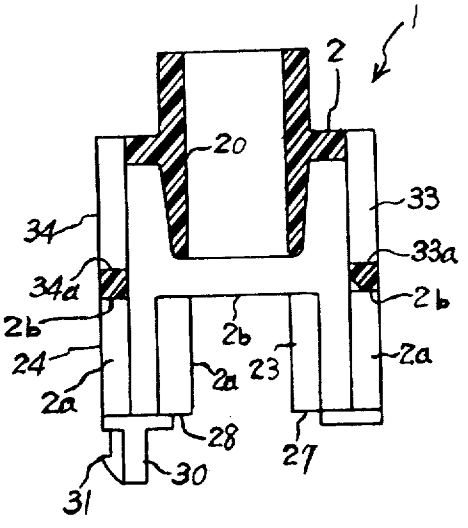
FIG. 7 is a vertical sectional view along line VII—VII of FIG. 5.
Figure 8:
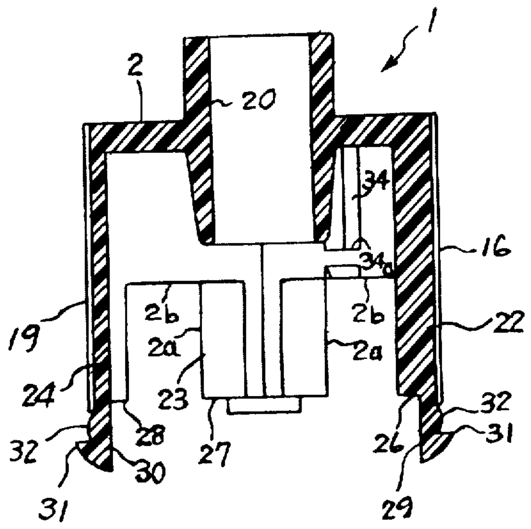
FIG. 8 is a vertical sectional view along line VIII—VIII of FIG. 1.
Figure 9:
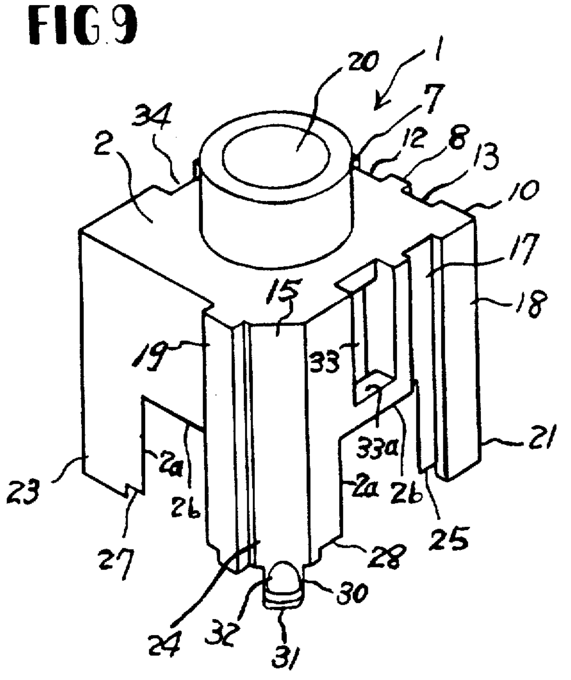
FIG. 9 is a perspective view of the holder block shown in FIG. 1.
Figure 11:
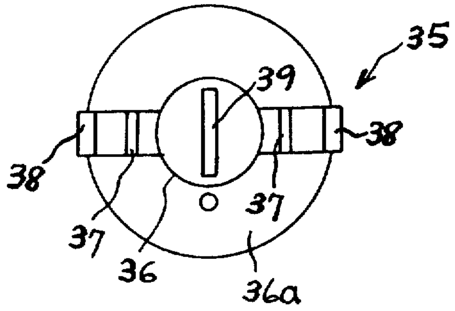
FIG. 11 is a plan view of the key stem shown in FIG. 10.
Figure 10:
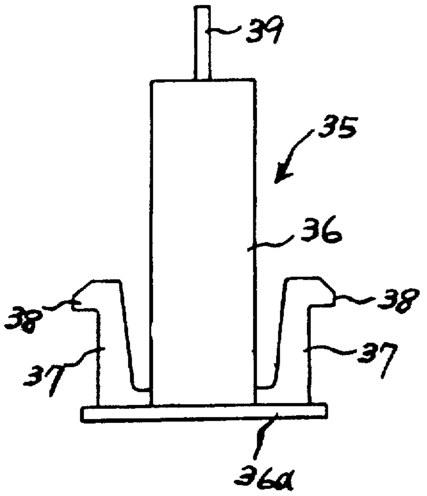
FIG. 10 is a front view of a key stem of the keyboard switch arrangement according to an embodiment of this invention.
Figure 12:
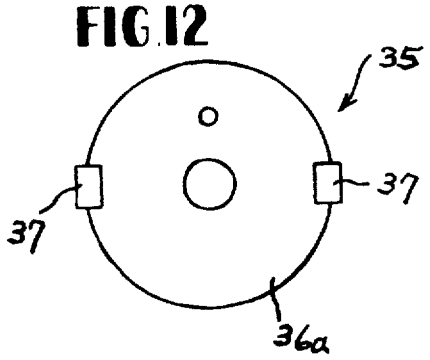
FIG. 12 is a bottom view of the arrangement shown in FIG. 10.

Throughout the figures, numeral 1 denotes an integrally formed stem holder block, which is made of synthetic resin and has a main body 2 having substantially a square shape in cross-section and a given height. The main body 2 is provided with ridges and grooves around its outer side walls. The main body 2 consists of a first side wall 3, a second side wall 4 opposite the first side wall 3, a third side wall 5 and a fourth side wall 6 opposite the third side wall 5. The aforesaid first side wall 3 has a vertically extending first and second ridges 7 and 8 which are provided at a symmetric position with respect to a central axis extending in the vertical direction of the first side wall. Provided adjacent to the first ridge 7 is a third ridge 9 which extends in the vertical direction of the main body, and a vertically extending fourthridge 10 is provided adjacent to the second ridge 8, said fourth ridge 10 involving therein an angular portion of the main body 2. With the formation of these ridges, there are also formed many grooves; a first groove 11 is formed between the first ridge 7 and the third ridge 9, a second groove 12 between the first ridge 7 and the second ridge 8, a third groove 13 between the second ridge 8 and the fourth ridge 10, respectively. In this case, the first, second and third grooves 11, 12 and 13 each has equal width and pitch, and the fourth ridge 10 has a width which will fit in respective grooves 11, 12 and 13.

An angular portion, where the aforesaid first side wall 3 crosses the fourth side wall 6, and an angular portion, where the aforesaid second side wall 4 crosses the third side wall 5, are beveled at 14 and 15, respectively. Adjacent to the aforesaid beveled portion 14 on the fourth side wall 6, a fifth ridge 16 extends in the vertical direction. In a portion on the third side wall 5 which is symmetric to the aforesaid fifth ridge 16 with respect to the lateral line perpendicular to the horizontal line in FIG. 1, a fourth groove 17 runs in the vertical direction of the main body and has a width as much as receiving therein the aforesaid fifth ridge 16. A sixth ridge 18 extends in the vertical direction between the aforesaid fourth groove 17 provided on the third side wall 5 and the fourth ridge 10 on the first side wall 3, said sixth ridge 18 having a width which will fit in the aforesaid grooves 11, 12 and 13. In a portion on the second side wall 4, which is adjacent to the aforesaid beveled portion 15, i.e., in a portion on the second side wall which is symmetrical to the aforesaid third groove 13 with respect to the horizontal line, there is provided a vertically extending seventh ridge 19 having a width which will fit in the aforesaid respective grooves 11, 12 and 13.

Numeral 20 denotes a cylindrical member having a central guide slot and formed integrally with the main body 2. The cylindrical member 20 partly projects upwardly by a predetermined length from the main body 2, with the remaining part being merged in the main body 2. the main body 2, i.e., four outer side walls, is cut away at its lower half part 2*a*, with four angular portions thereof being left, to form four legs 21, 22, 23 and 24 thereat. These four legs 21, 22, 23 and 24 each have abutting portions 25, 26, 27 and 28 each of which is provided on the inner face of each leg in a portion slightly at the lower end thereof and has a flat face making right angles with the longitudinal axis of each leg 21, 22, 23 or 24. Of these four legs 21, 22, 23 and 24, the legs 22 and 24 are diagonally aligned, are provided at their lower ends with engaging projections 29 and 30, respectively, which are formed integrally with legs and extend downwardly. The engaging projections 29 and 30 each have an engaging pawl 31 which is directed outwardly of the leg. The legs 22 and 24 further have bulged portions 32 having a spherical surface and provided on the side the same as the side where the engaging pawl of each projection 29 or 30 projects. Provided on the third and fourth side walls 5 and 6 of the main body 2 are elongated guide apertures 33 and 34 which run through the entire vertical length of these side walls.

Numeral 35 denotes a key stem which is integrally formed of synthetic resin and has a cylindrical sliding portion 36 movably inserted in the guide 20 of the stem holder block 1. The cylindrical sliding portion 36 has a lower end provided with a disc-shaped flange 36*a*, said lower end being located within the aforesaid main body 2. Provided on the upper surface of the flange 36*a* are a pair of arms 37 which extend upwardly in a line-symmetrical configuration with respect to the longitudinal axis of sliding portion 36. The pair of arms 37 are accommodated within the main body 2 of the stem holder block 1 and have upper ends provided with retaining pieces 38 which are free to move vertically within the aforesaid guide apertures 33 and 34. The aforesaid key stem 35 has at its end a connecting projection 39 integrally formed therewith and projecting upwardly thereof, to which connecting projection 39 is attached under pressure a push-button 40 for actuating a switch. For assembling the key stem 35 to the stem holder block 1, the key stem 35 is inserted in the guide slot of cylindrical member 20 from the lower opening thereof, with the pair of arms 37 being resiliently deformed and drawing near the sliding portion 36 by exerting external force thereon. Subsequently, while the external force is removed therefrom so as to restore the pair of arms to the initial state, the retaining pieces 38 are accommodated within the guide apertures 33 and 34, respectively, thereby achieving the assembling of the key stem to the stem holder block 1. With the key stem 35 being incorporated in the stem holder block, the key stem 35 is substantially protected from slipping out from the stem holder block by virtue of the engagement of the retaining pieces 38 with the lower extremities 33*a* and 34*a* of guide apertures 33 and 34 provided in the stem holder block. The upper limit of the upward movement of the sliding portion 36 of the key stem 35 is provided by abutting the outer circumference of the aforesaid flange 36*a* with the upper edges 2*b* of respective cut-away portions 2*a* of respective side faces of stem holder block 1.

Figure 15:
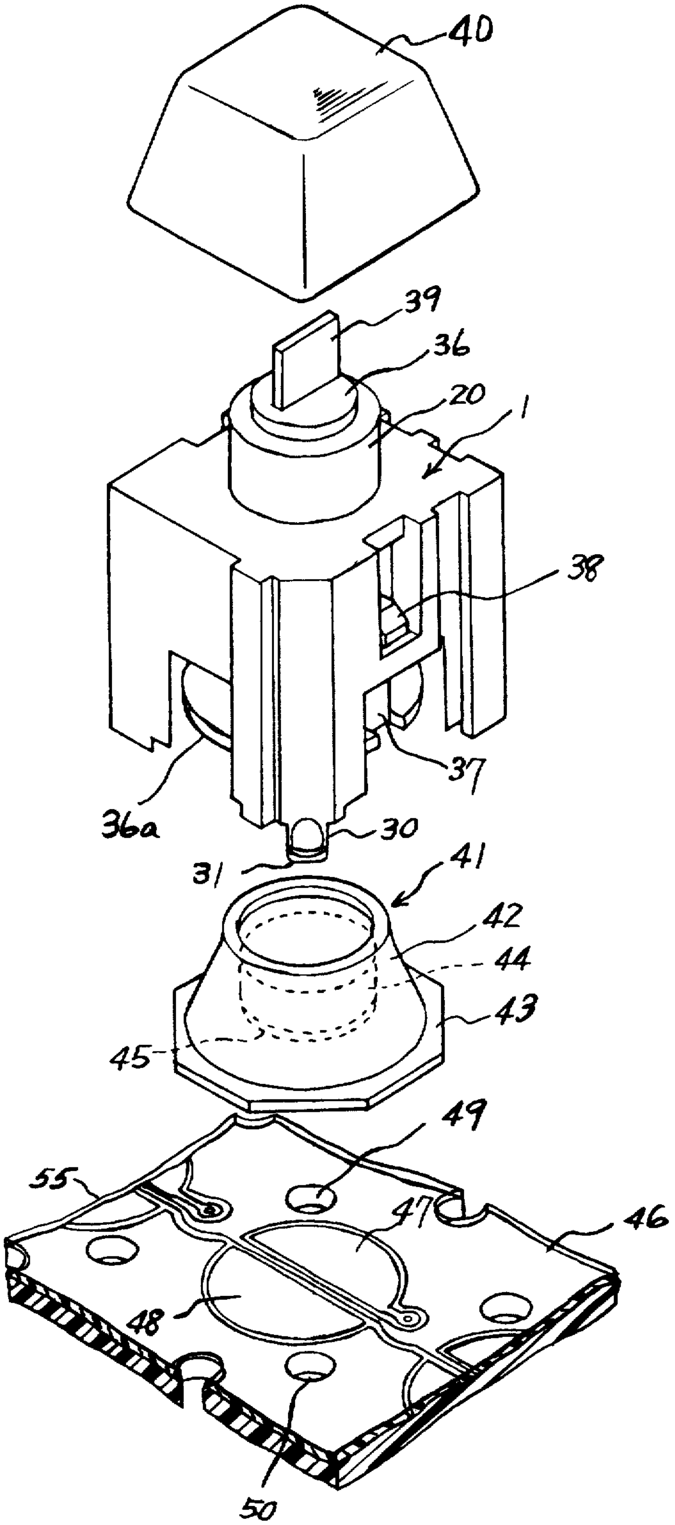
FIG. 15 is an exploded perspective view of a key switch unit of the keyboard switch arrangement according to an embodiment of this invention.

Shown at 41 (FIG. 15) is a movable electrode mechanism which constitutes part of a capacitor switch. The movable electrode mechanism has an inverted cup like, i.e., truncated conical-shaped resilient cone 42 made of synthetic resin and having a resiliency suited for being usually restored to the initial state. Extending around the entire circumference of the lower opening of the resilient cone 42 is an outwardly directed flange 43. A resilient member 44 made of an electrically insulating material is attached to the reverse side of the upper end of resilient cone 42, with a lower end thereof having an electrode layer 45 serving as a movable electrode.

Numeral 46 denotes a base plate, on which the aforesaid stem holder block is mounted, and which is made of an insulating plate with an upper surface provided with the given printed circuits. Numerals 47 and 48 denote a pair of fixed electrodes. Provided adjacent to these fixed electrodes 47 and 48 are a pair of engaging holes 49 and 50, in which the engaging projections 29 and 30 of the stem holder block 1 are inserted in engaging relation thereto. The aforesaid movable electrode mechanism 41 is placed on the base plate 46 with the electrode layer 45 facing the aforesaid pair of fixed electrodes 47 and 48. As the movable electrode mechanism 41 is maintained in this situation, the respective engaging projections 29 and 30 of the stem holder block 1 is inserted in respective engaging holes 49 and 50 of the base plate 46. At this time, the engaging projections 29 and 30 are resiliently deformed and drawn towards each other, because of respective engaging pawls 31 being slidingly brought into contact with the inner circumferences of the engaging holes 49 and 50 when they pass therethrough. After the engaging pawls 31 have passed through the engaging holes 49 and 50, the engaging projections 29 and 30 are released from the resiliently deformed condition, to thereby be restored to the initial state, whereby the engaging pawls 31 are brought into engagement with the circumferences of engaging holes 49 and 50, respectively, thereby mounting the stem holder block 1 on the base plate 46.

Thus, the flange 43 of the aforesaid resilient cone 42 is held stably in position between the abutting portions 25, 26, 27 and 28 provided on respective legs 21, 22, 23 and 24 of stem holder block 1 and the upper surface of base plate 46. When the button 40 is manipulated to be pushed downwardly for actuating the switching means, the key stem 35 is shifted downwards to urge the resilient cone 42 downwardly while the resilient cone 42 is deformed, whereby the electrode layer 45 is brought into contact with the insulating layer 55 of the pair of fixed electrodes 47 and 48 on the base plate 46, and the capacity of static electricity is increased to turn the switch on. When the push-button 40 is released, the key stem 35 is urged upwardly by virture of the restoring force of the resilient cone 42, thereby turning the switch off. During the above-described movement, the shift of the key stem 35 is insured, without causing the revolution of the key stem itself, by virture of the engagement of the retaining pieces 38 with the guide apertures 33 and 34 provided in the stem holder block 1.

Figure 18:
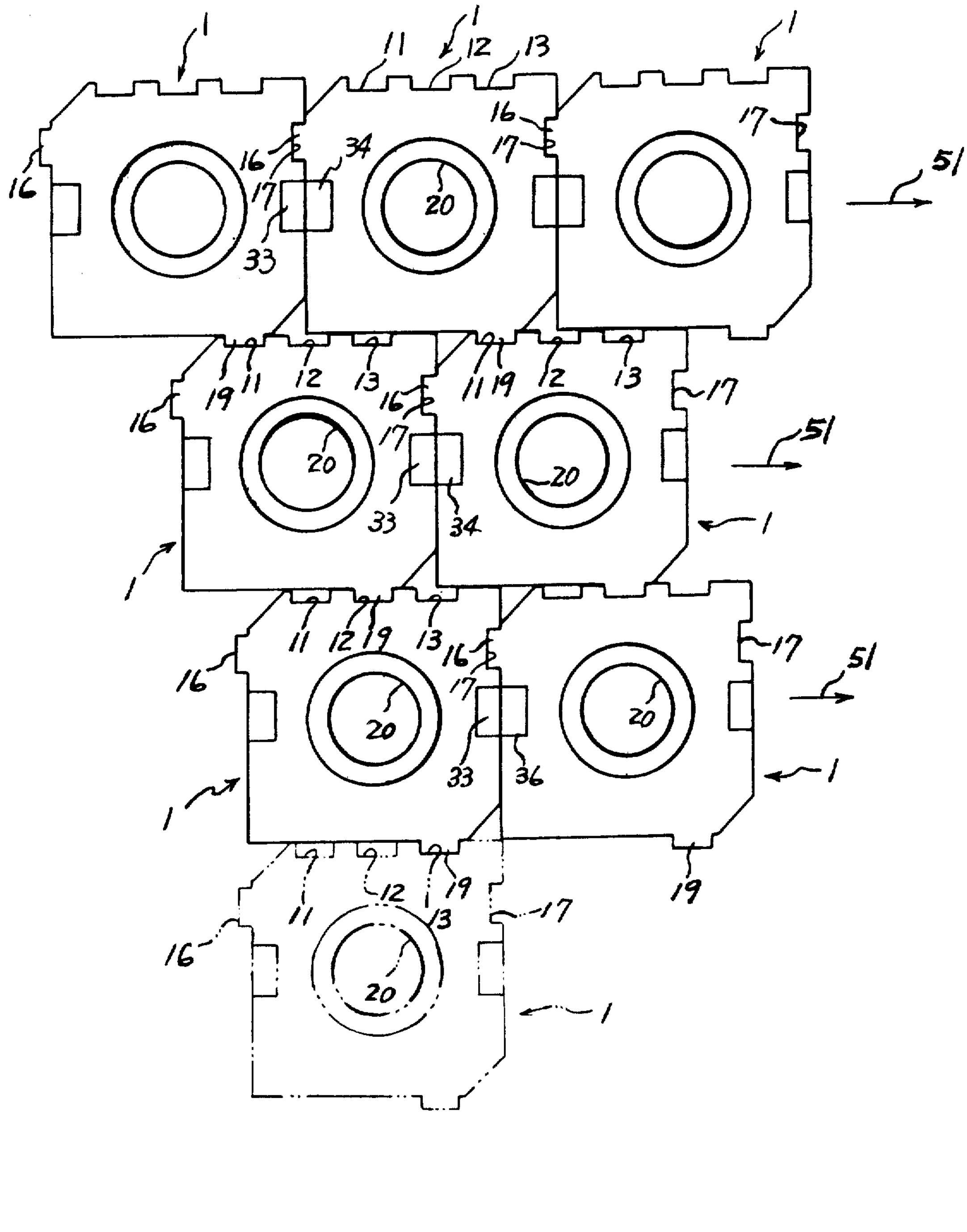
FIG. 18 is a plan view showing an arrangement of the holder blocks.

The above description is given only to a case where a single stem holder block 1 is mounted on the base plate 46. A plurality of stem holder blocks 1 may be mounted on the base plate 46 in a manner hereinafter described. As shown in FIG. 18, plural rows of stem holder blocks 1 are arranged in side by side relation wherein the direction of the rows are shown by the arrow 51. Each row of stem holder blocks 1 consist of a plurality of stem holder blocks 1 coupled in contiguous relation to one another in a manner that the fifth ridge 16 of the fourth side wall 6 of one stem holder block 1 is fitted, in coupling relation, in the fourth groove 17 formed on the third side wall 5 of the other stem holder block 1. For coupling the first row of stem holder blocks 1 with the second row of stem holder blocks 1, the seventh ridge 19 provided on the second side wall 4 of each of stem holder blocks 1 constituting the first row is fitted in the first groove 11 provided in the first side wall 3 of each of stem holder blocks 1 constituting the second row. Accordingly, each stem holder block which constitutes the second row is arranged in a position shifted by one-half a block with respect to each of stem holder blocks of the first row. For coupling the second row with the third row, the second groove 12 provided on the first side wall 3 of each of stem holder blocks 1 constituting the third row receives therein the seventh ridge 19 provided on the second side wall 4 of each of stem holder blocks 1 constituting the second row. Thus, respective stem holder blocks of the third row are arranged in position shifted by one-third block with respect to respective stem holder blocks of the second row. In this case, if the seventh ridge 19 provided on the second side wall 4 of each of stem holder blocks 1 of the preceding row is fitted in the third groove 13 provided on the first side wall 3 of each of stem holder blocks 1 of the succeeding row, as shown by the two-dotted line in FIG. 18, then stem holder blocks of both rows are arranged in alignment with one another.

Figure 19:
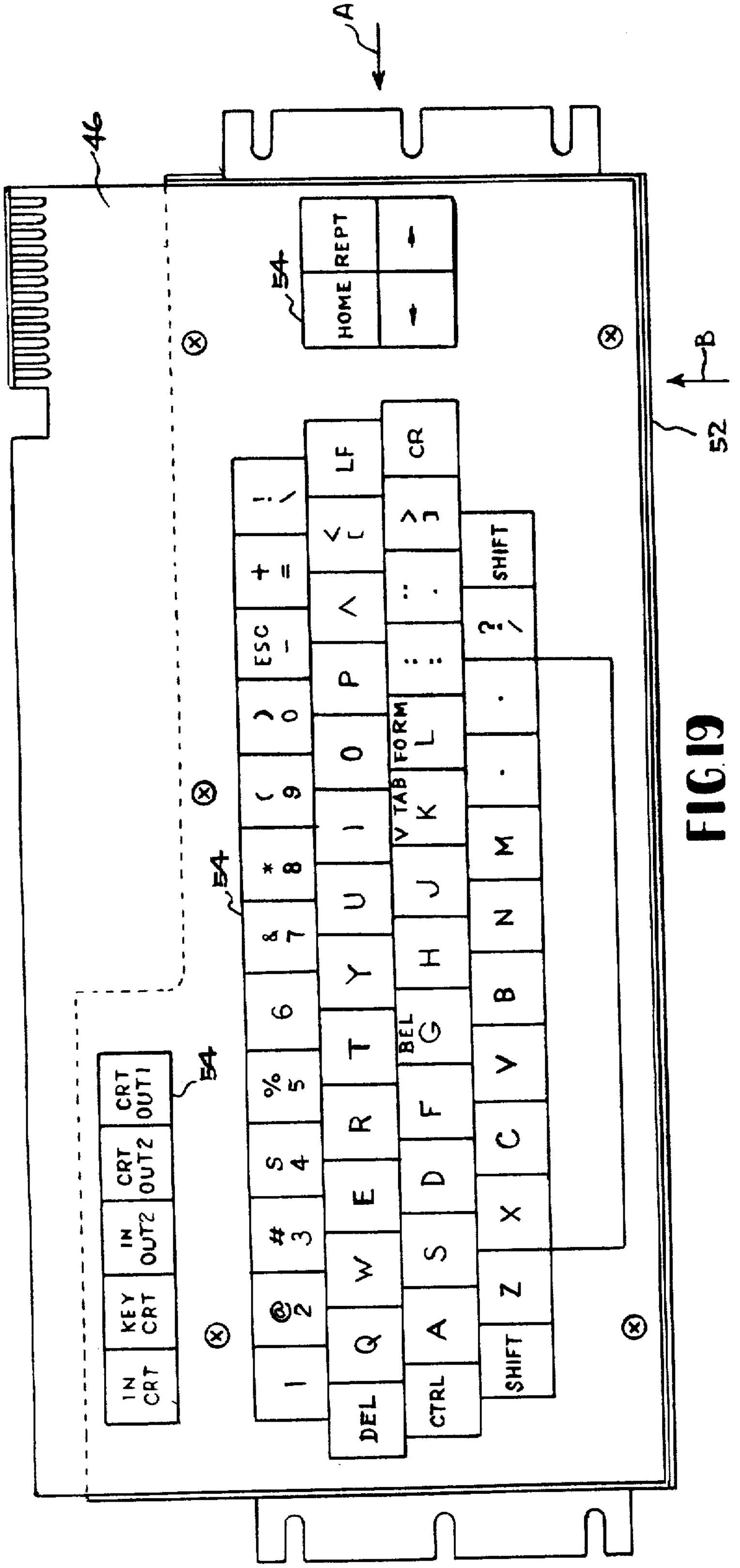
FIG. 19 is a plan view showing a construction of flame and base plate of the keyboard switch arrangement.
Figure 21:
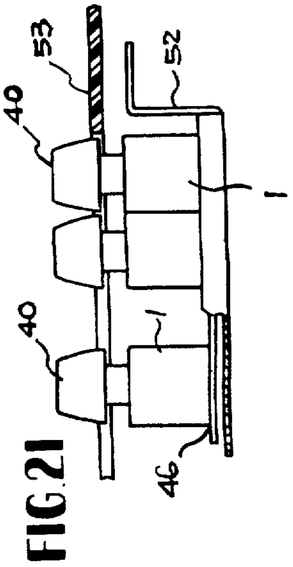
FIG. 21 is a sectional view of a main portion showing the keyboard constructed in the directions of arrow B in FIG. 19.
Figure 20:
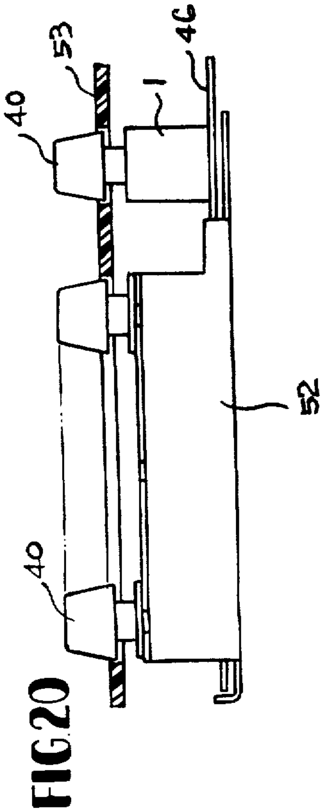
FIG. 20 is a sectional view of a main portion showing the keyboard constructed in the directions of arrow A in FIG. 19.

The arrangement of stem holder blocks 1 may be changed in various modes by selecting ridges and grooves provided on outer side walls of each stem holder block 1 which are brought into engagement with each other. Thus, stem holder blocks may be arranged in a manner to facilitate the use of the key. In the meantime, where a single stem holder block 1 is mounted on the base plate 46, with the engaging projections 29 and 30 being engaged with the engaging holes 49 and 50, the single stem holder block 1 is unstable for the external force which is exerted thereon, because the engaging projections 29 and 30 tend to be resiliently deformed, or because the clearance is left between the enganging pawls 31 of engaging projections 29 and 30 and the engaging holes 49 and 50. On the contrary, in case of a plurality of stem holder blocks 1 being coupled with one another, ridges 16, 19 and the grooves 11, 12, 13 and 17 of respective stem holder blocks 1 are in coupling relation to one another to thereby establish a mechanical unification as a whole, with the result of increasing the resistance to the external force, and thus the stem holder blocks 1 are stabilized. With a plurality of stem holder blocks being mounted on the base plate, an individual stem holder block 1 may be freely demounted from the base plate 46, as required. After a required number of keys are inserted in the base plate 46 as described, and the required electric parts are incorporated in the printed circuits, the base plate 46 is fitted in a frame 52, and then a cover plate 53 having a cut-away portion is mounted on the frame 52 in a fashion to project push-button 40 alone from the cut-away portion thereof. In FIG. 19, an arrangement of a keyboard contemplated herein is illustrated at 54, and cross-sectional views of the keyboard are shown in FIG. 20 and FIG. 21.

What is claimed is:

1. A keyboard switch arrangement comprising in combination:

a. a base plate (46);

a plurality of keys each including a key stem (35), a push-button (40) attached thereon and a key stem holder block (1) with outer side walls mounted on said base plate for preventing said key stem from slipping out, said holder block having coupling portions on the outer side wall for coupling to an adjacent holder block so that said holder block and said adjacent block are in contiguous relation to one another;

b. a plurality of resilient means (42) mounted on said base plate (46) each having a restoring force against deformation by manipulative depressing of said push button including an inverted cup-like resilient cone; and, c. a plurality of switching means (41) corresponding to each key and said resilient means and turning to switch ON when said push-button (40) is selectively manipulated and pushed downwardly, said switching means including a pair of fixed electrodes provided on said base plate and covered by an electrically insulating layer on the surface and a resilient member made of an electrically insulating material with the lower end having an electrode layer, said member being attached to the reverse side of upper end of said cone, said electrode layer and said fixed electrodes constituting a capacitor switch.

2. A keyboard switch arrangement according to claim 1 wherein said coupling portions consist of a groove (12) on one outer side wall, a ridge (10) on the opposite outer side wall for being fitted into the groove of a similar adjacent holder block, a plurality of grooves on another outer side wall and a ridge on the opposite outer side wall for selectively being fitted into the groove of said similar adjacent holder block.

3. A keyboard switch arrangement according to claim 1 wherein said coupling portions of a groove is on one outer side wall, a ridge on the opposite outer side wall for being fitted into the groove of a similar adjacent holder block, a plurality of grooves on another outer side wall and a ridge on the opposite outer side wall for selectively being fittable in the groove of said similar adjacent holder block.

4. A keyboard switch arrangement comprising in combination:

a base plate (46);

a plurality of keys each including:

a key stem (35) in the form of a cylindrical portion (36) and having a disk-shaped flange (36a) at the lower end and retaining pieces outwardly extending, a push-button attached to the upper end of said cylindrical portion, and a key stem holder block (1) mounted on said base plate (46) including a guide slot and guide portions for preventing said key stem from slipping out so disposed that said cylindrical portion slides in said guide slot and said retaining pieces are movably inserted in said guide portions, said guide slot and said guide portions being formed at the upper portion and in the side wall of said holder block, said holder block having a groove on the one outer side wall, a ridge on the opposite outer side wall for being fitted in the groove of a similar adjacent holder block, a plurality of grooves on another outer side wall and a ridge on the other opposite side wall for selectively being fitted in the groove of a similar adjacent holder block;

a plurality of resilient means (42) each connected to one of said push-buttons each having a restoring force against deformation by depressing said push-button consisting of an inverted cup-like cone; and, a plurality of switching means (41) each corresponding to one of said key stems and said resilient means and turning to switch ON when said push-button is pushed down, said switching means each including a pair of fixed electrodes provided on said base plate covered by an electrically insulating layer on the surface, and a resilient member made of an electrically insulating material with the lower end having an electrode layer, said resilient member being attached to the reverse side of upper end of said cone, said electrode layer and said fixed electrodes constituting a capacitor switch.

5. A keyboard switch arrangement comprising in combination a. a base plate having engaging holes therein;

b. a plurality of keys arranged side by side on said base plate each including a key stem, a push button thereon, a key stem holder block with outer side wall and a lowest portion thereof for preventing said key stem from slipping out, affixed on said base plate including engaging projections provided at said lowest portion inserted into corresponding engaging holes formed in said base plate, and coupling means provided on said outer side walls of said holder block, including vertically extending ridges and grooves, so arranged and disposed that a ridge of said one holder block fits into a corresponding groove of an adjacent holder block;

c. a plurality of resilient means each consisting of an inverted cup-like resilient cone disposed between each key stem and said base plate, and said resilient means each having a restoring force against deformation by manipulative depressing of said push button; and, d. a plurality of capacitor switches corresponding to each key, said capacitor switches each including a pair of fixed electrodes on said base plate covered by an electrically insulating layer on the surface and a movable electrode layer attached to the inner surface of top end of said cone, the capacity of static electricity between said pair of fixed electrodes being increased to turn the switch on when said push button is manipulated and pushed down against the restoring force of said cone.

6. A keyboard switch arrangement according to claim 5 wherein said ridges and grooves coupling means comprises a groove on one outer side wall, a ridge on the opposite outer side wall being fittable into the groove of an adjacent holder block, a plurality of grooves on another outer side wall and a ridge on the other opposite side wall selectively fittable into the groove of another adjacent holder block, said coupling means interlocking said one holder block with said adjacent holder blocks, said holder blocks being stably disposed in various modes on said base plate by selectively fitting a ridge of said one holder block into a groove of said other holder block.

7. A keyboard switch arrangement comprising in combination:

a. a base plate having engaging holes therein;

b. a plurality of keys arranged side by side on said base plate each including a key stem in the form of a cylindrical portion with upper and lower ends having a disc-shaped flange at said lower end and outwardly extending retaining pieces, a push button attached to said upper end, a key stem holder block with outer side walls an upper and a lowest portion, fixed on said base plate including engaging projections provided at said lowest portion inserted into corresponding engaging holes formed in said base plate, said holder block including a guide slot and guide portions for preventing said key stem from slipping out and turning, so disposed that said key stem cylindrical portion slides in said guide slot and retaining pieces movably inserted in said guide portions, said guide slot being formed at said key stem holder block upper portion and said guide portions being defined in said side wall of said holder block, and coupling means formed on said outer side walls of said holder block and comprising a groove on one outer side wall, a ridge on the opposite outer side wall adopted and designed to fit in the groove of another adjacent holder block, said coupling means stably interlocking the holder block with adjacent holder blocks and arranging the holder blocks in various modes on said base plate by selectively fitting a ridge of one holder block into a groove of another holder block;

c. a plurality of resilient means each consisting of an inverted cup-like resilient cone disposed between said base plate and said disc-shaped flange of each key stem, said resilient means each having a restoring force against deformation by manipulative depressing of said push button; and, d. a plurality of capacitor switches corresponding to each key, each including a pair of fixed electrodes provided on said base plate covered by an electrically insulating layer on the surface and a movable electrode layer attached to the inner surface of top end of said cone, the capacity of static electricity between said pair of fixed electrodes being increased to turn the switch on when said push button is manipulated to be pused down against the restoring force of said cone as said electrode layer is brought into contact with said insulating layer on said pair of fixed electrodes.

8. A keyboard switch arrangement comprising in combination:

a. a base plate having engaging holes therein;

b. a plurality of key switch units arranged side by side on said base plate, each including a key stem, a push button attached thereon, key stem holder block with four outer side walls, an upper and lowest portions fixed on said base plate, preventing said key stem from slipping out, including engaging projections provided at said lowest portion inserted into corresponding engaging holes formed in said base plate, said holder blocks having substantially a square shape in cross-section, and having at least one wall comprising thereon a plurality of vertically oriented grooves, and switch means located within said holder blocks operated by manipulative depressing said push button;

c. coupling means provided on said outer side walls of each of said holder blocks and comprising a plurality of grooves on a first side wall, a ridge on a second side wall opposite to said first side wall, a groove on a third side wall and a ridge on a fourth side wall opposite to said third side wall, said ridges and grooves extending vertically on said respective outer side walls, said coupling means interlocking one holder block with adjacent holder blocks and holding said holder blocks stably in various modes on said base plate in a manner that a ridge on a fourth side wall of one block is fitted with a groove on a third side wall of an adjacent holder block, and a ridge on a second side wall of the one block is selectively fitted with one of grooves on a first side wall of another adjacent holder block.

* * * * *